United States Patent [19]
Castellani

[11] Patent Number: 5,340,270
[45] Date of Patent: Aug. 23, 1994

[54] PACKING METHOD AND BAR PACKER WITH HANGING TRANSFER

[75] Inventor: Federico Castellani, Tarcento, Italy

[73] Assignee: S.I.M.A.C. S.P.A., Italy

[21] Appl. No.: 845,246

[22] Filed: Mar. 3, 1992

[30] Foreign Application Priority Data

Mar. 6, 1991 [IT] Italy ............................ UD91A000030
Mar. 6, 1991 [IT] Italy ............................ UD91A000031

[51] Int. Cl.⁵ .............................................. B65G 57/04
[52] U.S. Cl. .............................. 414/793.2; 414/797.01
[58] Field of Search ................ 414/793.2, 797.1, 788.3, 414/791.4

[56] References Cited

U.S. PATENT DOCUMENTS 4,278,377 7/1981 Elineau ......................... 414/793.2 X

FOREIGN PATENT DOCUMENTS 1183020 12/1964 Fed. Rep. of Germany ... 414/793.2

*Primary Examiner*—Richard A. Schacher
*Attorney, Agent, or Firm*—Harrison & Egbert

[57] ABSTRACT

A bars packer plant having hung transfer magnets for packing bar layers differentiated in number including a single linear system of rotating hung transfer magnets movable between a position above a supply line with bar layers to be picked up to a position above a pack formation pocket. The transfer magnets rotate by turning upside down. A lifter is provided below the supply line and below the hung transfer magnets in a pick-up area. The lifter serves to lift one bar layer and attach it to a magnetic pickup surface above and below the hung transfer magnets, depending on the rotation of the magnetic pickup surface.

10 Claims, 11 Drawing Sheets

PACKING METHOD AND BAR PACKER WITH HANGING TRANSFER

TECHNICAL FIELD

The present invention concerns a packing method and its respective bars packer with hanging transfer particularly for rolling plants, wherein it is also possible to pack bar layers which are differentiated in number and have to be superposed upright and reverse, as for example angle bars.

BACKGROUND ART

Packing plants having transfers equipped with overturning means having a rotating arm that substantially rotates for 180° to and fro through example angle bars (L-shaped profiles) from a supply device of alternating bar layers n bars and n−1 bars, see for example IT833-49A/88 (SIMAC), have been in use for years. These solutions are complex and cumbersome, and further present the drawback of lying on the supply line between the feeder of the layers n and n−1 and the pack formation pocket which is intended to receive these overlapped layers alternatively upright and overturned, said transfer rotating arm carrying out the transfer and the alternating overturning.

Packing plants with hanging transfer causing less hindrance on the supply line, are known also from patents of the same applicant:

IT83471/88 (SIMAC) discloses an oscillating pendulum hanging transfer device having non-rotatable bar layers pick-up magnets associated to an upwards overturning transfer to form a double bar layer n and n−1, with an intermediate transfer which positions the double layer under the oscillating transfer for the final transfer to the packing area.

IT83488A/88 (SIMAC) explains a hung transfer, oscillating, or on a trolley, having a couple of fixed non-rotatable magnets, then necessarily associated to an upwards overturner in order to pick-up alternatively a first n bar layer and the other one a second n−1 bar layer, etc.

IT83302A/89 (SIMAC) concerning a method and plant for packing profiles with the aid of a transfer having two hung non-rotatable magnets, yet always associated to an underlying auxiliary overturning means.

The use of these auxiliary overturning means is complex and expensive.

The object of the present invention is to obviate said drawbacks.

A further object is also to make it possible to form bar bundles in bulk in the same plant without the aid of intermediate transfers, through simple dropping into a pocket, this being very suitable e.g. for the formation of round bar bundles and the like.

SUMMARY OF THE INVENTION

This and other objects are achieved by the present invention as claimed, by means of a bar packer method and plant having hung transfer magnets particularly for rolling plants, wherein it is also possible to pack bar layers different in number (e.g. n,n−1) which have to be superposed upright and reverse from a layers supply line of differentiated number, characterized in that the plant:

has only one linear system of hung transfer magnets:
  at least from above the supply line with the respective bar layers to be picked-up in a pick-up area in the supply line,
  to above an adjacent pack formation pocket for the respective laying down and formation of the pack;
said hung transfer magnets are rotatable for the upset;
a lifting means is provided below the supply system, and below said hung transfer magnets in their respective pick-up area, in order to lift one bar layer and attach it to the same magnetic pick up surface either above or below said transfer magnets, depending upon the rotation of the magnetic pick-up surface.

The plant works in accordance with the following transfer phases for the formation of packs of overlapped alternate (n,n−1) bar layers:

after the rotation of the upwards pick-up magnetic plane of said magnetic transfer means, lift through said lifting means a first bar layer (n−1) over the transfer plane and pick-up from below said lifter the respective first bar layer thus lifted over said plane of advancement rotate the pick-up plane of said magnetic means downwards, while a second bar layer (n) is advancing on said transfer plane;

lift through said lifter this second bar layer over said transfer plane bringing it into contact with the first bar layer, and go down letting the second bar layer be joined through magnetization under the first (phase 3);

lay down the layer pairs thus associated into the pocket for the pack formation (phase 5) and rotate upwards the pick-up face of said magnetic transfer means, in order to repeat the cycle (phase 6).

Advantageously said rotating hung transfer magnets are movable from above and below said supply line and the plant works according to the following transfer phases for the formation of packs of overlapped alternate bar layers n.

after the upwards rotation of the magnetic pick-up plane of said magnetic transfer means, pick-up from below a first bar layer;

go up the vertical above said transfer plane (1) and rotate downwards the pick-up plane of said magnetic means, while a second bar layer is advancing on said transfer plane;

lift through said lifter this second bar layer over said transfer plane bringing it into contact with the first bar layer and go down letting the second bar layer be joined through magnetization under the first;

lay down the bar layer pairs thus associated into the pocket for the pack formation, and rotate upwards the pick-up face of said magnetic transfer means, in order to repeat the cycle.

Advantageously, the bars discharge system is close and almost above the pack formation pocket or can also be equipped with a slide.

Thanks to this solution, the system is greatly simplified and it is also possible, owing to the vicinity of the feeder end to the pocket, to form bundles of bars which are caused to fall directly into the pocket in bulk in a continuous way, as for example the packing of rods in the same plant.

The magnetic transfer has two opposite magnetic faces, which makes it possible to eliminate in such a way one rotation of the magnet itself, using once one magnetic face and once the other, i.e. varying the magnetic face for each operative cycle (one cycle for one face and one cycle for the other).

Through this solution, the advantage of saving a 180° rotation in order to return to the starting position is achieved.

BRIEF DESCRIPTION OF THE DRAWINGS

The invention is better understood through the joined description and drawings supplied only by way of example, where.

DETAILED DESCRIPTION OF THE INVENTION

Figure 1:
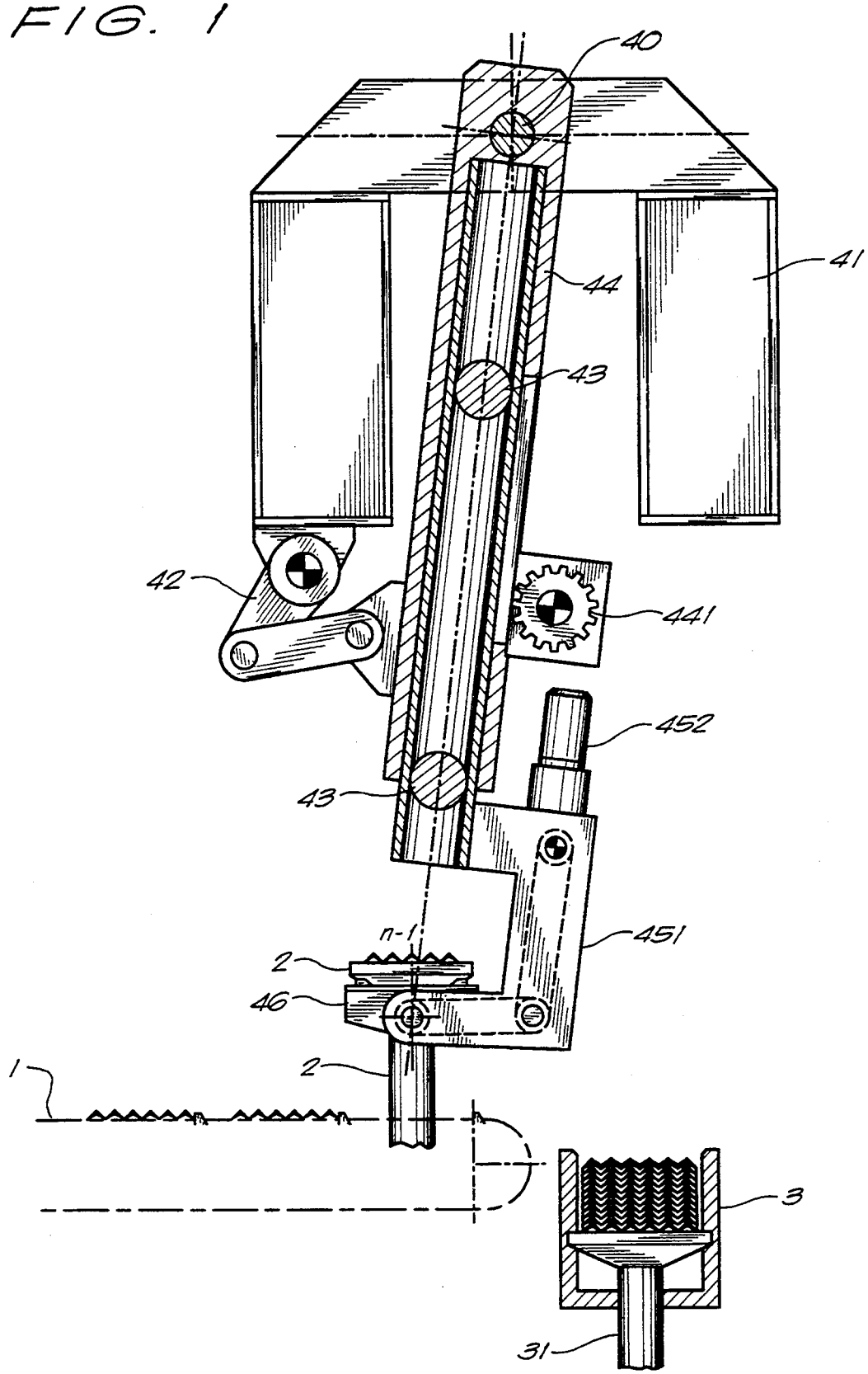
FIGS. 1 and 1A represent a schematic view of the transfer in a bar layer picking-up from the feeder phase, in both solutions: movable from above and from above and below respectively.
Figure 1A:
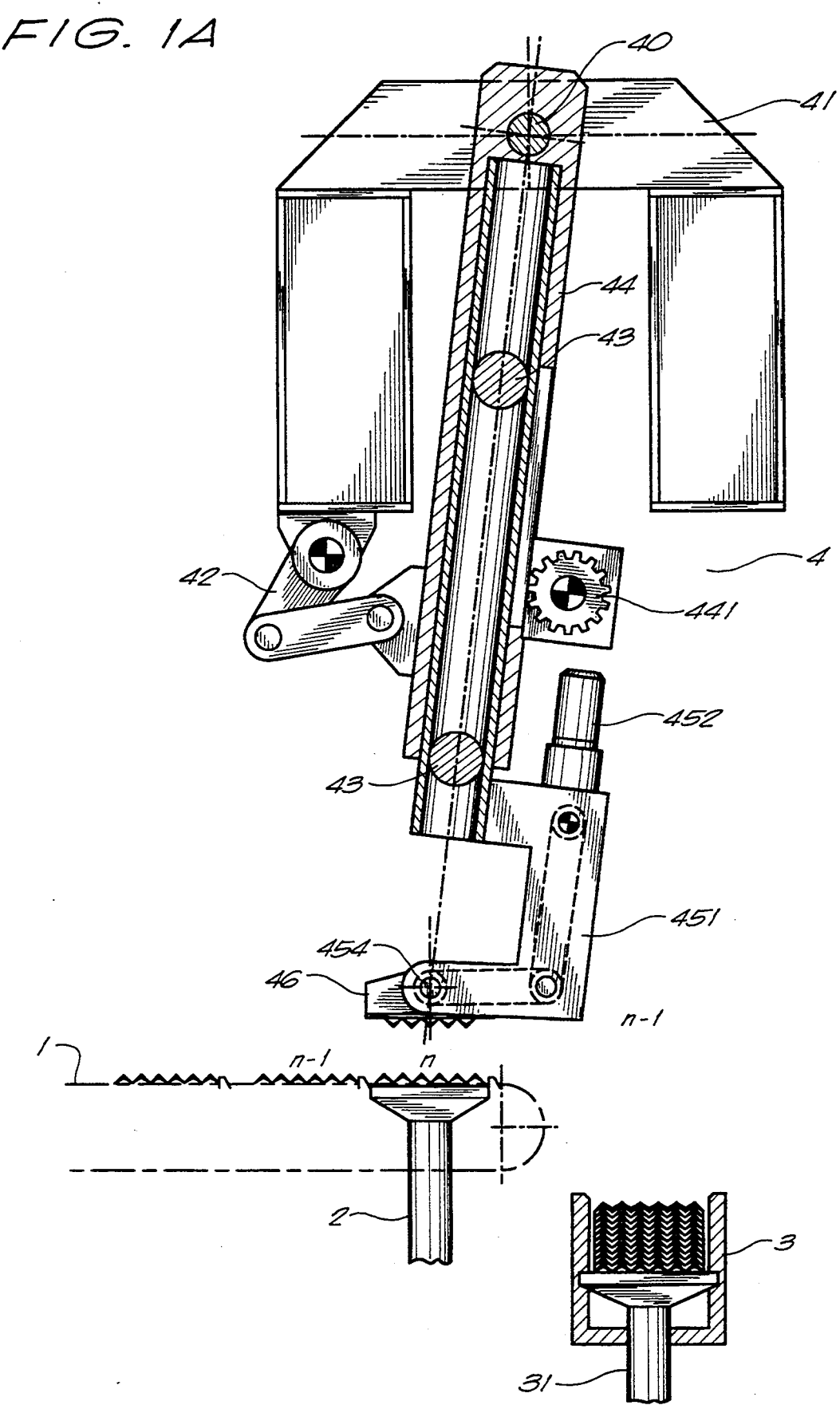
Figure 2:
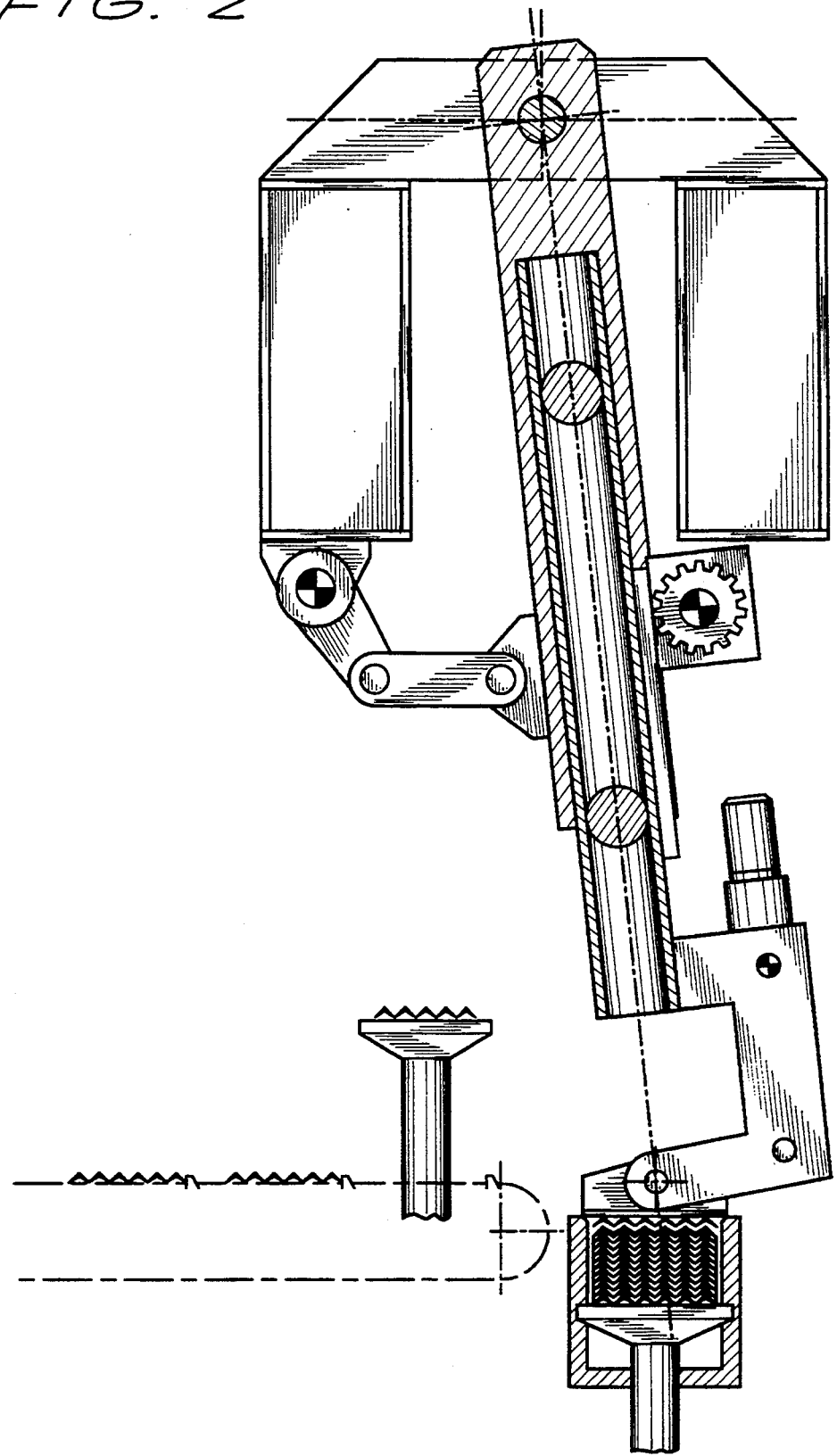
FIGS. 2 and 2A represent a schematic view of the transfer in the laying down into the pack formation pocket phase, in both solutions: movable from above and from above and below respectively.
Figure 2A:
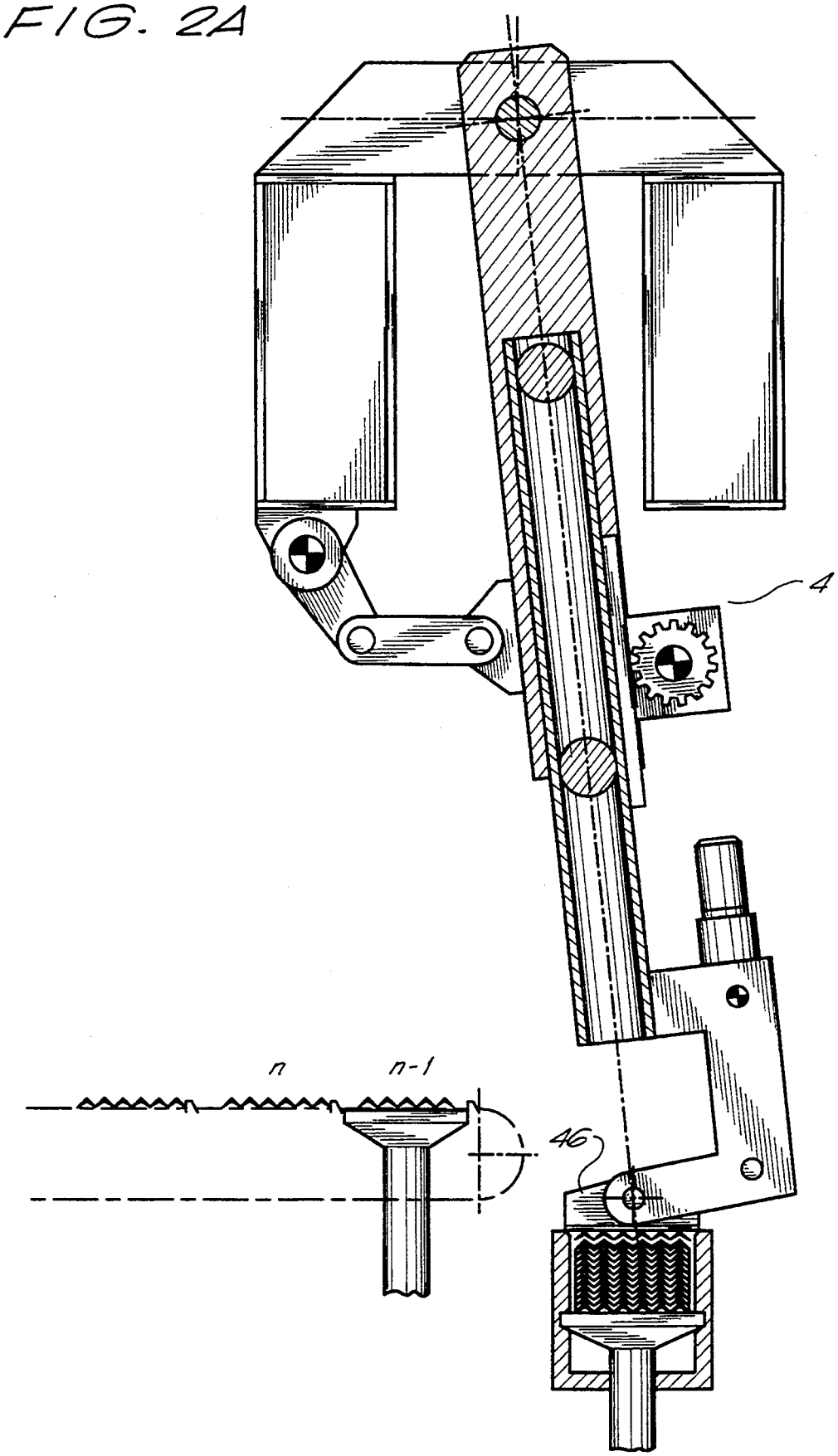

Referring to FIGS. 1 to 6:

The transfer includes a bar layers n and n−1 (1) supply system associated to a bar layer lifting device in the pick-up area 2 in order to stop it in its pick-up position under the hanging transfer 4 which is hung by a pendulum-like (40) arm (44) and made to oscillate by an eccentric or connecting-rod crank lever or equivalent or some other suitable means (42).

The oscillating pendulum-like arm (44) can be extended and shortened by means of a telescopic system (43) transmission (441) and at its end it presents a C-shaped hook-like form, the lower end of which has pivoted (454) magnetic rotatable pick-up bars means (46) suitable to pick-up bar layers (n,n−1) from the supply system (1) and to lay them down into a pack formation pocket (3) equipped with a lowerable lower plane (31).

The view of only one magnet will be noted from the figures. In fact these can be lined up in determined number for the picking-up of proper length bars. The motors for the pendulum transfer movement, for its elongation or shortening, and for the magnet rotation, are conveniently carried out by means of step motors.

Figure 6:
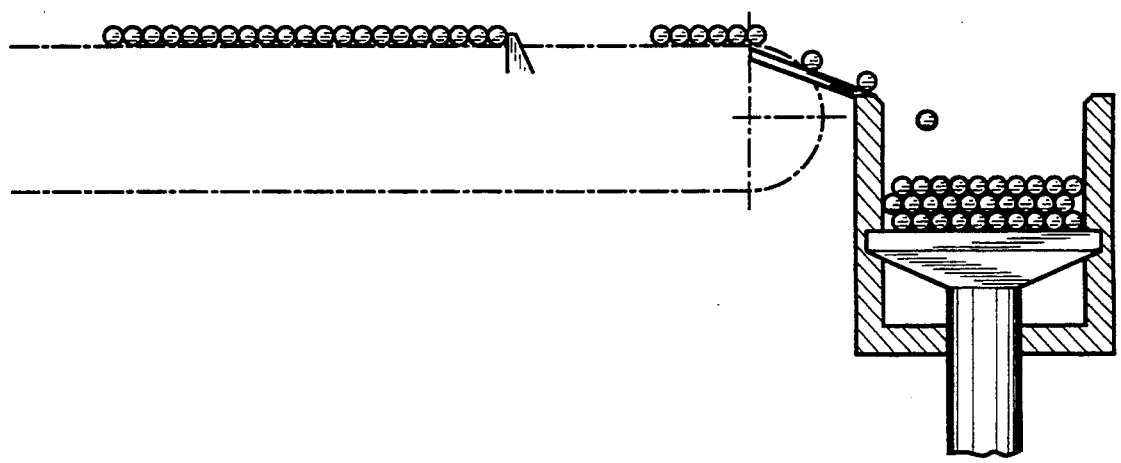
FIGS. 6 and 6A represent the formation of bar bundles through direct dropping by means of a slide, with the transfer device not active, in both solutions: movable from above and from above and below respectively.
Figure 6A:
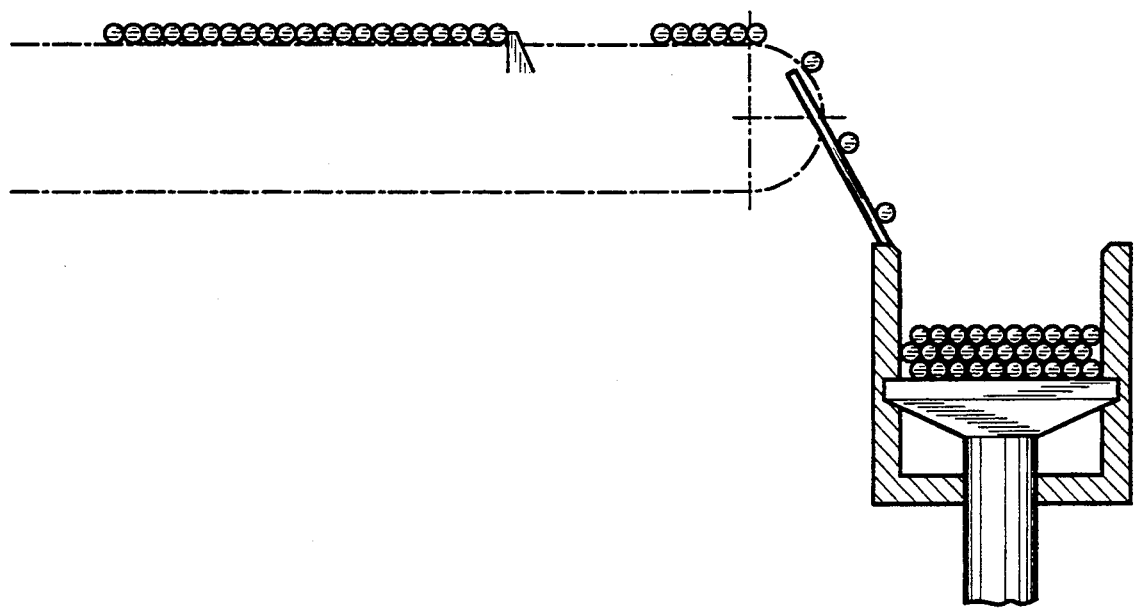

In FIG. 6 is illustrated a slide for the direct dropping of the bars into the pocket, but it is apparent that this can be different as from the prior art, e.g. also as the one indicated in the application IT83526A/88 (SIMAC) or any other suitable method.

Figure 3:
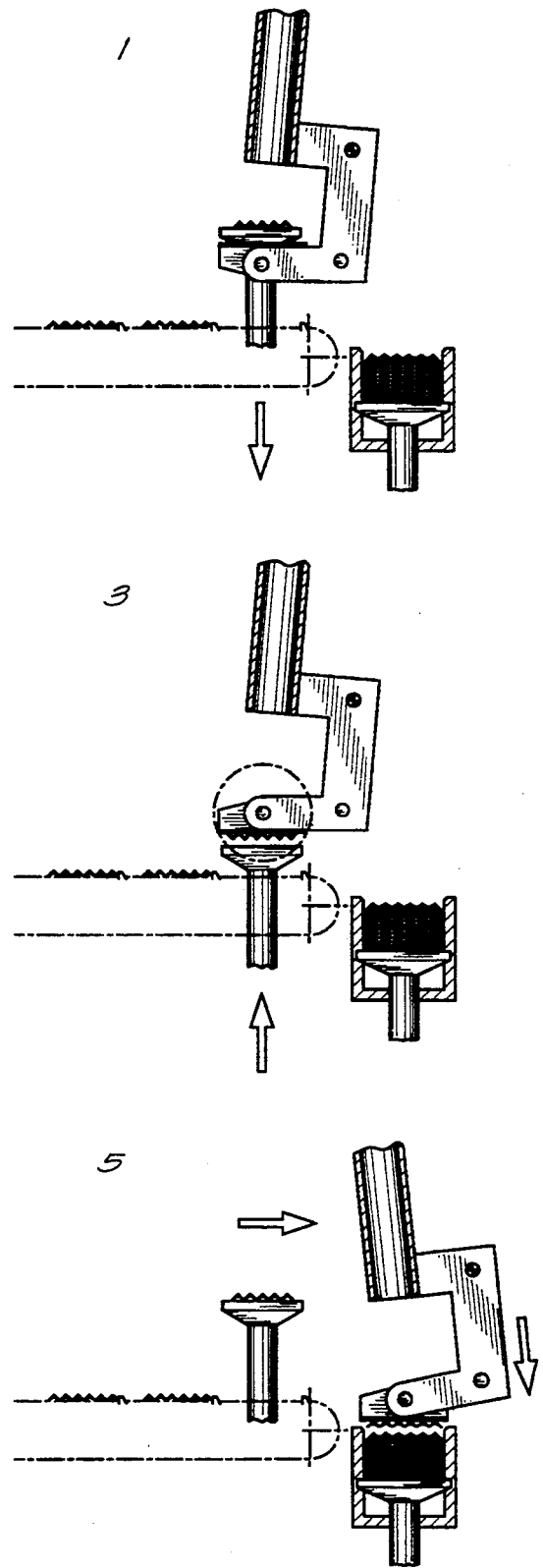
FIGS. 3 and 3A, represent a view from 1 to 6 of the transfer phases for angle bars in a first solution utilizing magnets with only one face of magnetic attraction, in both solutions: movable from above and from above and below respectively.
Figure 3:
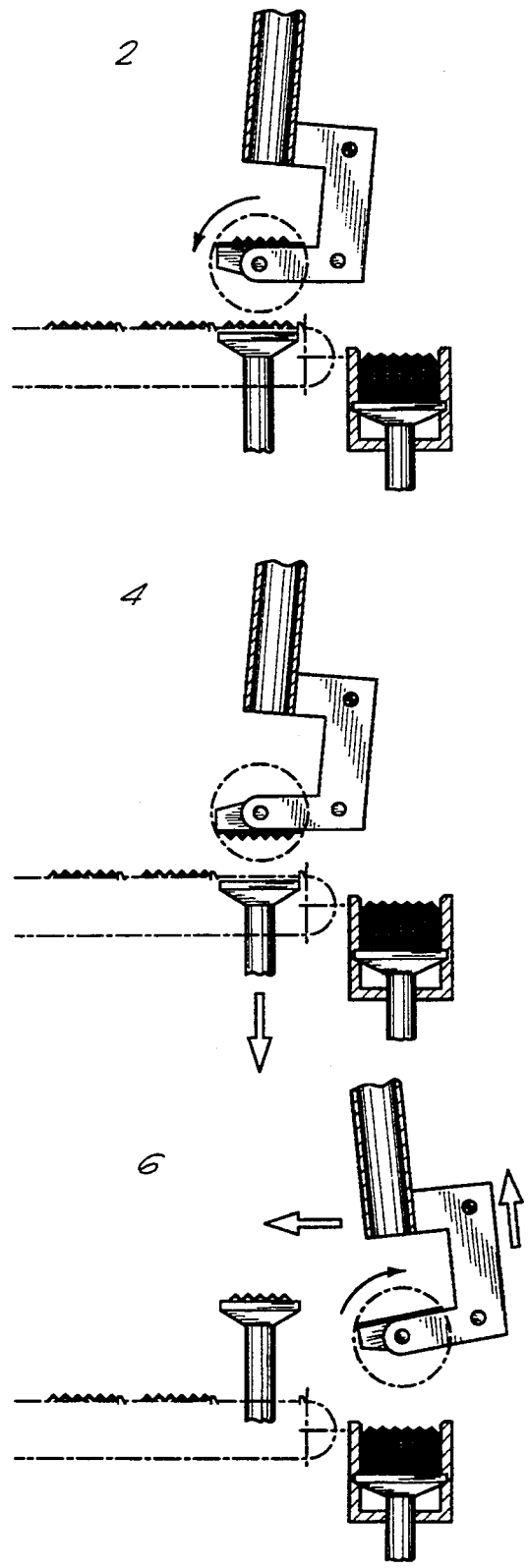

Operating mode
after the upwards rotation of the pick-up magnetic plane of said magnetic transfer means, lift through said lifting means (2) a first bar layer (n−1) over the transfer plane (1) and pick-up from below said lifter the respective first bar layer thus lifted over said advancement plane (1) (phase 1 FIG. 3)

rotate downwards the pick-up plane of said magnetic means, while a second bar layer (n) is advancing on said transfer plane (1) (phase 2 FIG. 3);

lift through said lifter (2) this second bar layer over said transfer plane (1), bringing it into contact with the first bar layer, and go down letting the second bar layer be joined through magnetization under the first (phases 3-4 FIG. 3);

lay down the layer pairs thus associated into the pocket (3) for the pack formation (phase 5 FIG. 3) and rotate upwards said magnetic transfer means pick-up faces, in order to repeat the cycle (phase 6 FIG. 3)

The step motor 452 transmits the rotation to the magnets 46 through known transmission means, e.g. a chain.

Figure 4:
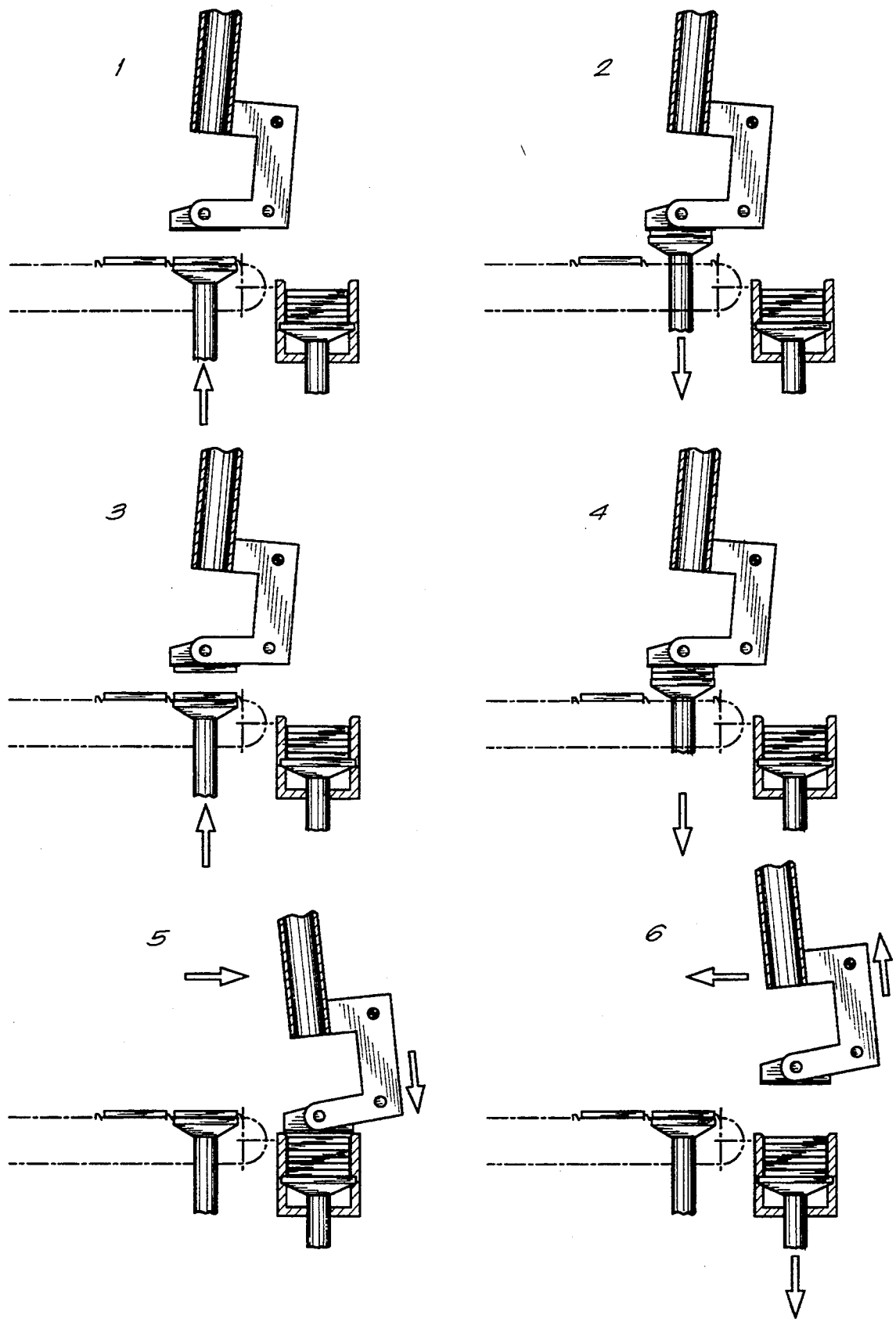
FIGS. 4 and 4A represent the operative phases for the formation of flat bar packs, in both solutions: movable from above and from above and below respectively.

As shown in FIG. 4, by means of the transfer it is also possible to transfer plates through simple pick-up and overlap phases:

lifting of the plate layer under the magnetic means surface and disengagement (phases 1,2 of FIG. 4);

advancement of a second plate layer under the transfer magnetic means (phase 3 of FIG. 4);

lifting of this second plate layer under the previous layer for the formation of two attached bar layers (phase 4 of FIG. 4);

transfer of the two bar layers to the pack formation pocket (phase 5 of FIG. 4) and return the magnets to the starting position, in order to repeate the cycle (phase 6 of FIG. 4).

Figure 5:
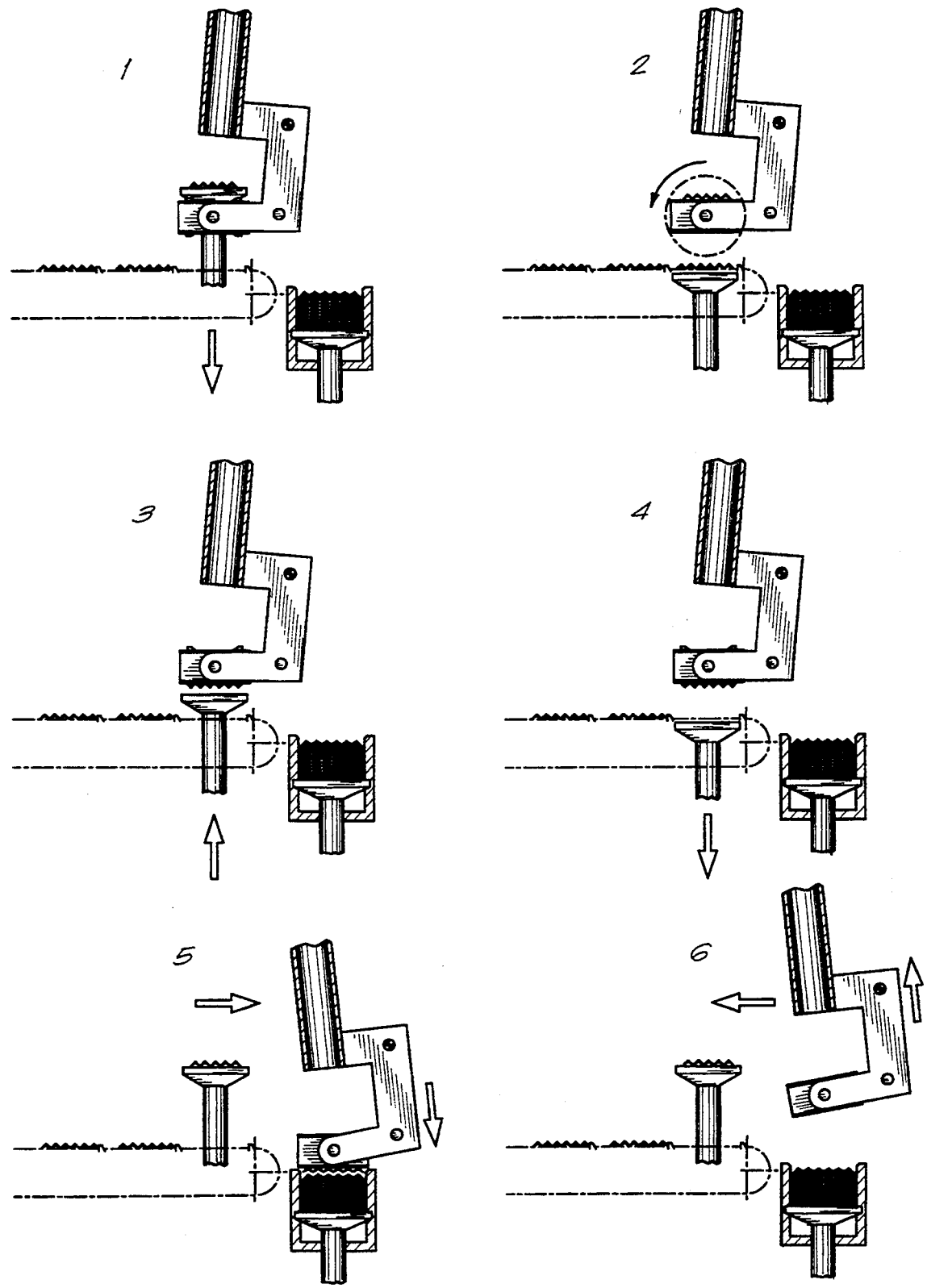
FIGS. 5 and 5A represent the phases for the formation of angle bar packs utilizing magnets with opposite magnetic faces, in both solutions: movable from above and from above and below respectively.

When using magnetic means having opposite pick-up faces as indicated in FIG. 5, one rotation of the magnetic means is saved by alternating the respective surfaces.

The cycle is the following:

independently from the rotational position of said magnetic transfer means (upright or reverse), lift through said lifting means (2) a first bar layer (n−1) over the transfer plane (1) and pick-up from below said lifter the respective first bar layer thus lifted over said plane of advancement (1) (phase 1 FIG. 5)

rotate said magnetic means through 180° with their layer directed downwardly, while a second bar layer (n) is advancing on said transfer plane (1) (phase 2 FIG. 5);

lift by means of said lifter (2) this second bar layer over said transfer plane (1) bringing it into contact with the first bar layer, and go down letting the second bar layer be joined through magnetization under the first (phases 3-4 FIG. 5);

lay down the layer pairs thus associated into the pocket (3) for the pack formation (phase 5 FIG. 5) and transfer the magnetic means over the pick-up area without need of rotation, in order to repeate the cycle (phase 6 FIG. 5).

Referring to FIGS. 1A to 6A:

The transfer includes a supply system of n and n−1 bar layers (1) associated to a bar layer lifting device in the pick-up area 2 in order to stop it in its pick-up position under the hanging transfer 4 which is hung by a pendulum (40) arm (44) and caused to oscillate by an eccentric or connecting-rod crank lever or equivalent or some suitable other means (42).

The oscillating pendulum arm (44) can be extended and shortened by means of a telescopic system (43) transmission (441), and at its end it presents a C-shaped hook-like form, the lower ending end of which has pivoted (454) rotatable magnetic bar pick-up means (46) suitable to pick-up bar layers (n,n−1) from the supply system (1) and to lay them down into a pack formation pocket (3) equipped with a lowerable lower plane (31).

The view of only one magnet will be noted from the figures. In fact, these can be lined up in determined number for the picking-up of bars of adequate length.

The motors for the movement of the pendulum transfer, for its elongation or shortening and for the rotation of the magnet, are suitably carried out by means of step motors.

In FIG. 6 is represented a slide for the direct dropping of the bars into the pocket, but it is apparent that this can be different as from the prior art also e.g. as the one indicated in the application IT83526A/88 (SIMAC), or any other suitable method.

Figure 3A:
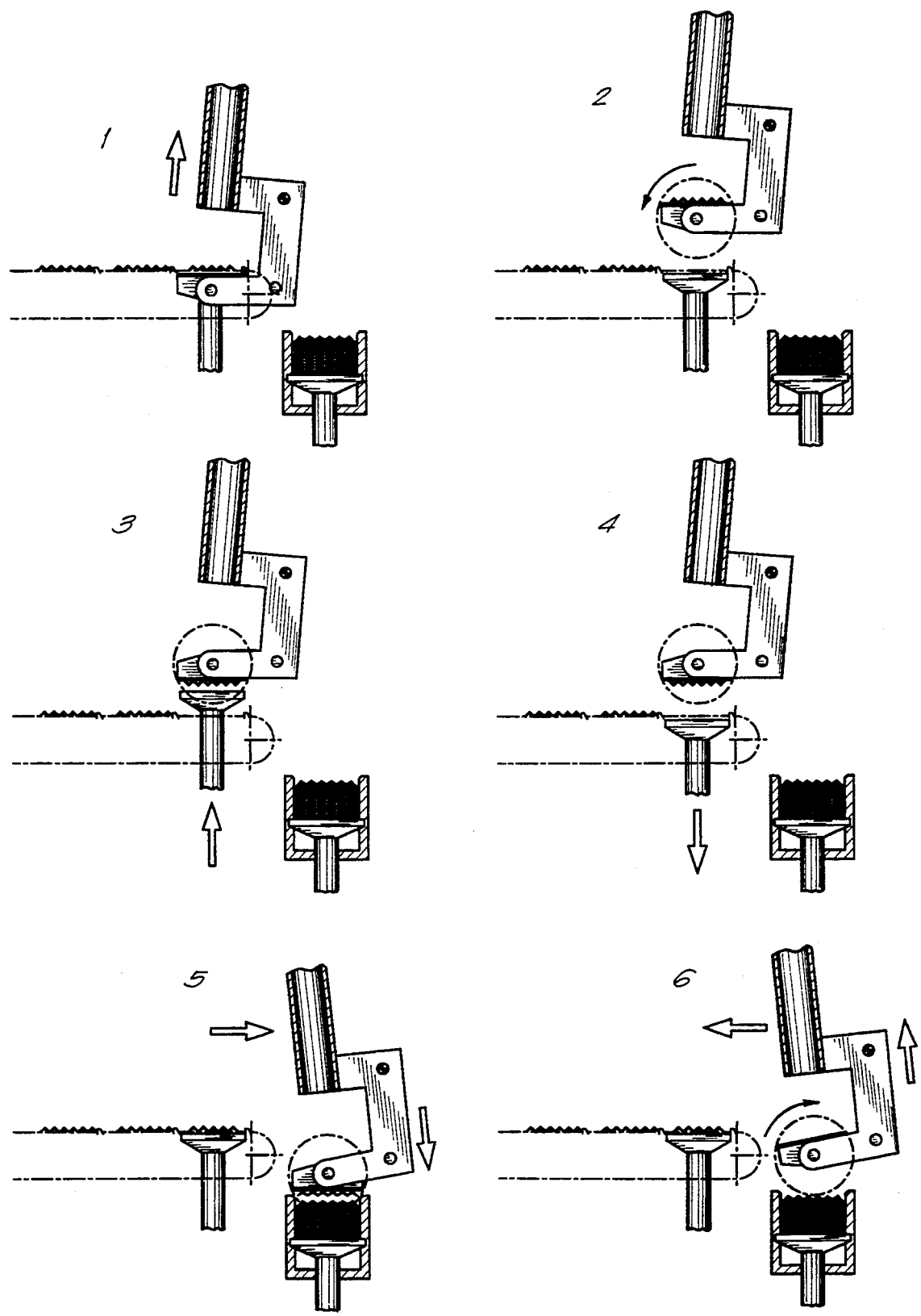

Operating mode.

by means of a transfer magnet which is rotated with its pick-up face directed upwards, picking-up of a first number of bars (n−1) from below (phase 1 FIG. 3A)

lifting on the vertical and rotation of the hung transfer magnet (46) in such a way that its face turns downwards, and advancement of a new bar layer in differentiated number (n) under the first (phase 2 FIG. 3A);

lifting of the underlying bar layers lifting device (2) for bringing the second bar layer into contact under the first in said magnet, in such a way that the same holds even this second layer (phase 3 FIG. 3A);

lowering of the underlying lifting device (phase 4 FIG. 3A);

transfer of the magnet over the pack formation pocket and laying down of the two bar layers (phase 5 FIG. 3A);

return of the hanging transfer under the bar layer in arrival in the supply device (1), in order to repeat the cycle.

The step motor 452 transmits the rotation to the magnets 46 through known transmission means, e.g. a chain.

Figure 4A:
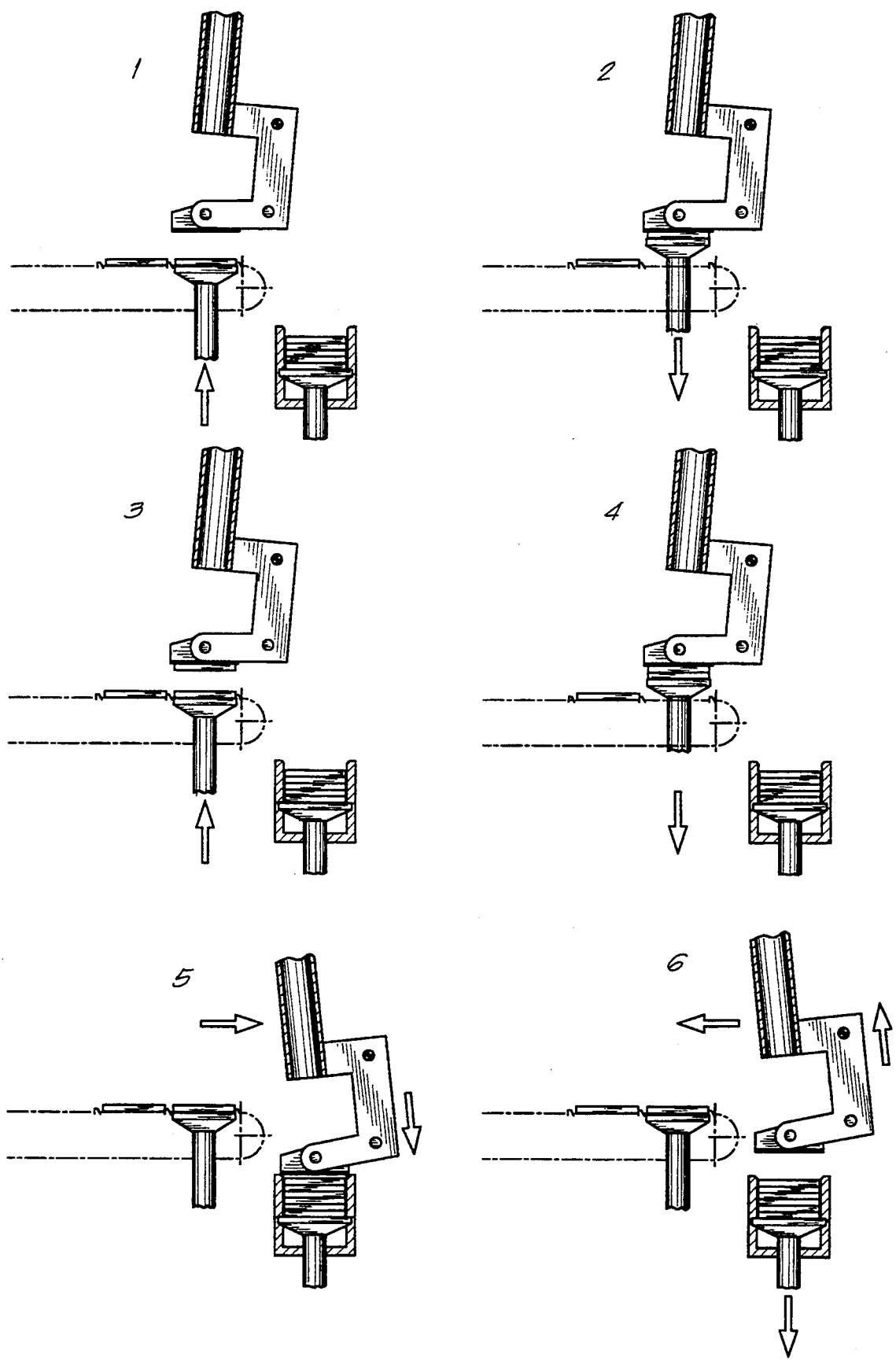

As from FIG. 4A, by means of the transfer it is possible to transfer also plates through simple picking-up and overlapping phases:

lifting of the plate layer under the surface of the magnetic means and disengagement (phases 1,2 of FIG. 4A);

advancement of a second plate layer under the magnetic means of the transfer (phase 3 of FIG. 4A);

lifting of this second plate layer under the previous layer for the formation of two attached bar layers (phase 4 of FIG. 4A);

transfer of the two bar layers to the pack formation pocket (phase 5 of FIG. 4A) and rotation of the magnetic means with their magnetic surface upwards and return to the starting position, in order to repeat the cycle (phase 6 of FIG. 4A).

Figure 5A:
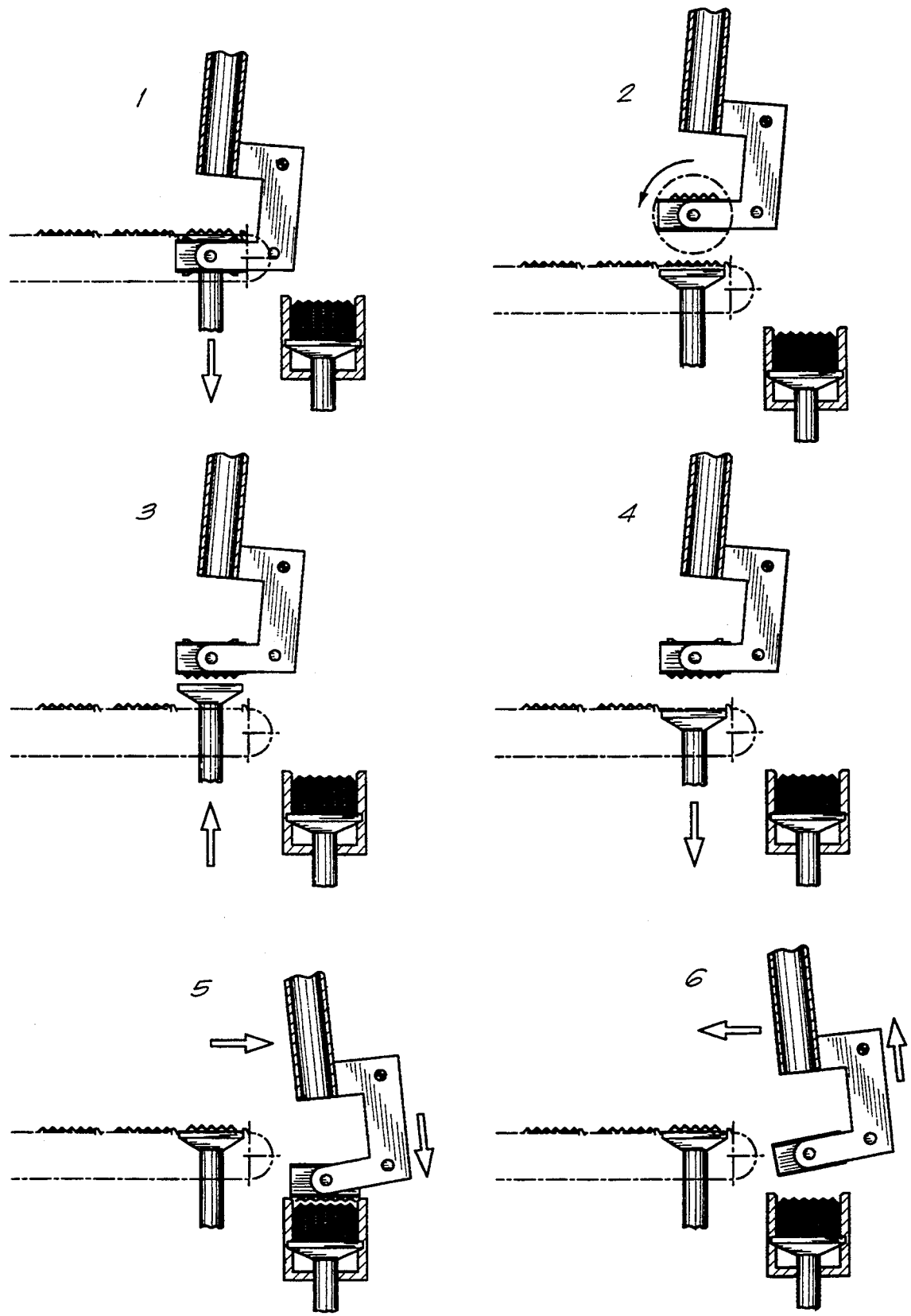

When using magnetic means with opposite pick-up faces as indicated in FIG. 5A, one rotation of the magnetic means is saved by alternating the respective surfaces.

The cycle is the following:

independently from the position of the respective magnetic planes of the magnetic transfer means, pick-up from below a first bar layer (phase 1 FIG. 5A)

go up the vertical above said transfer plane (1) and rotate the pick-up plane of said magnetic means downwards, while a second bar layer is advancing on said transfer plane (1) (phase 2 FIG. 5A);

lift through said lifter (2) this second bar layer over said transfer plane (1) bringing it into contact with the first bar layer, and go down letting the second bar layer be joined through magnetization under the first (phases 3–4 FIG. 5A);

lay down the layer pairs thus associated into the pocket (3) for the pack formation (phase 5 FIG. 5A) and replace upwards said magnetic transfer means in order to repeat the cycle without need of rotation of the same in their starting position (phase 6 FIG. 5A).

I claim:

1. A bars packer plant with hung transfer magnets for packing bar layers differentiated in number (e.g. n, n−1) which are superposed upright and in reverse from a layers supply line in differentiated number, said plant comprising:

a single linear system of rotating hung transfer magnets, said hung transfer magnets movable between a first position above the supply line in a pick-up area of the supply line to a second position above an adjacent pack formation pocket for a laying down and formation of the pack, said rotating hung transfer magnets rotate by turning upside down; and a lifter means positioned below the supply line and below said hung transfer magnets in said pick-up area, said lifter means for lifting one bar layer and attaching said bar layer to a magnetic pick-up surface either above or below said hung transfer magnets depending upon the rotation of said magnetic pickup surface, said hung transfer magnets are hung by a pendulum structure, an arm of the pendulum structure being extendable and shortenable during an operative cycle.

2. The bars packer plant according to claim 1, said plant for the formation of packs of overlapped alternate bar layers, said lifter means for lifting a first bar layer (n−1) over a transfer plane, said magnets picking up said first bar layer from below said lifter means, said first bar layer lifted over a plane of advancement, said magnets rotating through 180° in such a way that the picked-up layer overturns and moves downwards while a second bar layer advances on said transfer plane, said lifter means for lifting said second bar layer from said transfer plane so as to bring said second bar layer into contact with the first bar layer, said second bar layer joined through magnetization under the first bar layer, said first and second bar layers positioned into a pocket.

3. The bars packer plant according to claim 2, said packet is placed close to and below an ending edge of the bar advancement plane, said bars dropping in a rolling action from said supply line directly into said pocket.

4. The bars packer plant according to claim 1, said magnets have two opposite magnetic faces.

5. The bars packer plant according to claim 1, said hung transfer magnets are movable from above and below the supply line.

6. A bars packer plant with hung transfer magnets for packing bar layers differentiated in number (e.g. n, n−1) which are superposed upright and in reverse from a layers supply line in differentiated number, said plant comprising:

a single linear system of rotating hung transfer magnets, said hung transfer magnets movable between a first position above the supply line in a pick-up area of the supply line to a second position above an adjacent pack formation pocket for a laying down and formation of the pack, said rotating hung transfer magnets rotate by turning upside down; and a lifter means positioned below the supply line and below said hung transfer magnets in said pick-up area, said lifter means for lifting one bar layer and attaching said bar layer to a magnetic pick-up surface either above or below said hung transfer magnets depending upon the rotation of said magnetic pickup surface, said magnets are supported by a generally C-shaped hook.

7. A method of packing bars so as to form packs of overlapped alternate (n, n−1) bar layers, said method comprising the steps of:

picking up a first bar layer from below the first bar layer with a plurality of magnets;

moving said first bar layer vertically upwardly above a transfer plane;

rotating said plurality of magnets through 180° such that the picked-up layer overturns and is oriented downwardly;

advancing a second bar on said transfer plane as said magnets are rotating;

lifting said second bar layer over said transfer plane so as to bring it into contact with said first bar layer, said second bar layer attached magnetically under said first bar layer; and laying the attached layers into a pocket so as to form a pack.

8. The method of claim 7 further comprising the step of:

transferring said magnets to a pick-up position for picking up another bar layer.

9. The method of claim 7, said step of laying comprising:

dropping said attached layers from said transfer plane directly into said pocket.

10. The method of claim 7, further comprising the step of:

rotating said magnets upwardly prior to the step of picking up, each of said magnets having a bar pickup face.

* * * * *